March 20, 1962 — P. N. DOTZENROTH — 3,026,238
LABELING APPARATUS
Filed June 4, 1959 — 9 Sheets-Sheet 1

INVENTOR.
PAUL N. DOTZENROTH
BY Reif and Gregory
ATTORNEYS

March 20, 1962 P. N. DOTZENROTH 3,026,238
LABELING APPARATUS
Filed June 4, 1959 9 Sheets-Sheet 4

INVENTOR.
PAUL N. DOTZENROTH
BY Reif and Gregory
ATTORNEYS

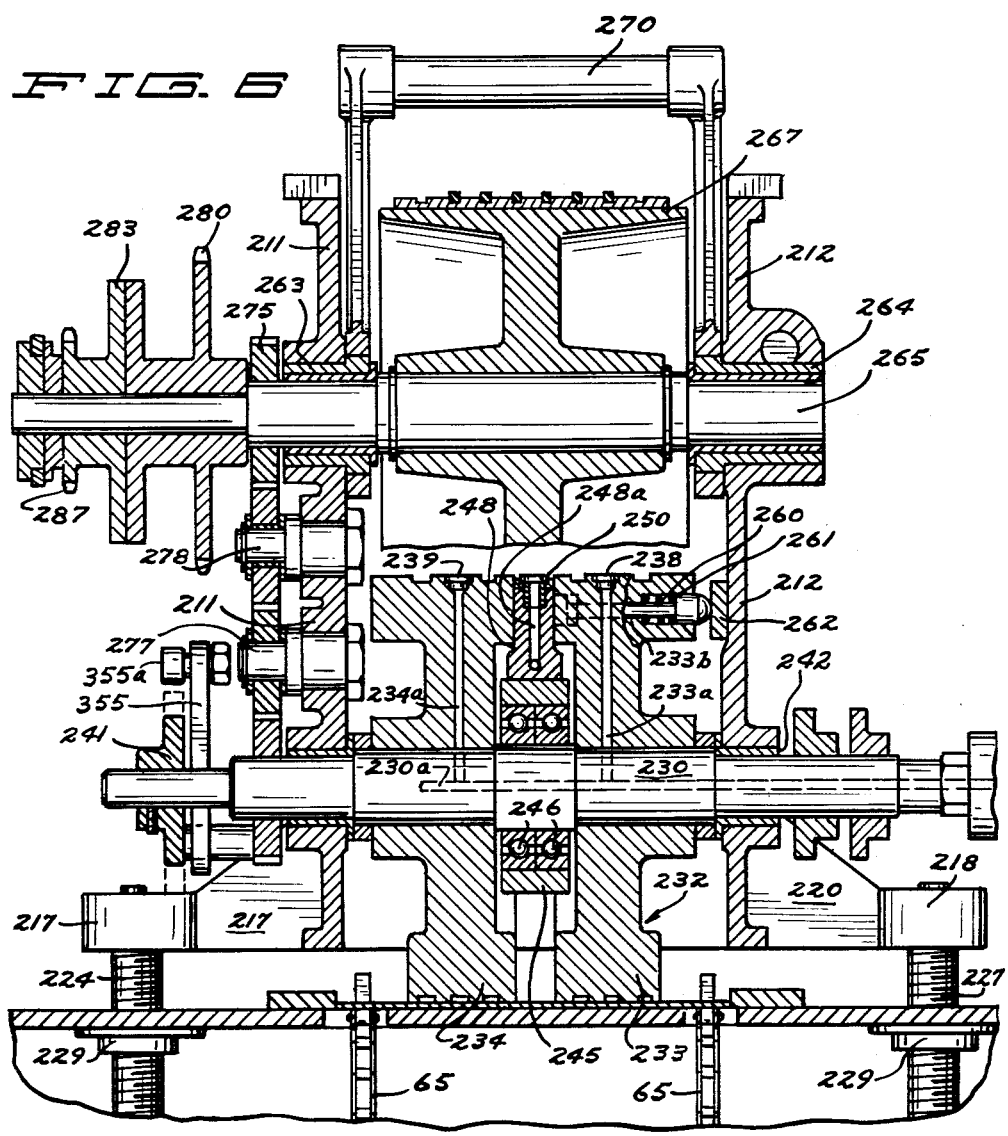

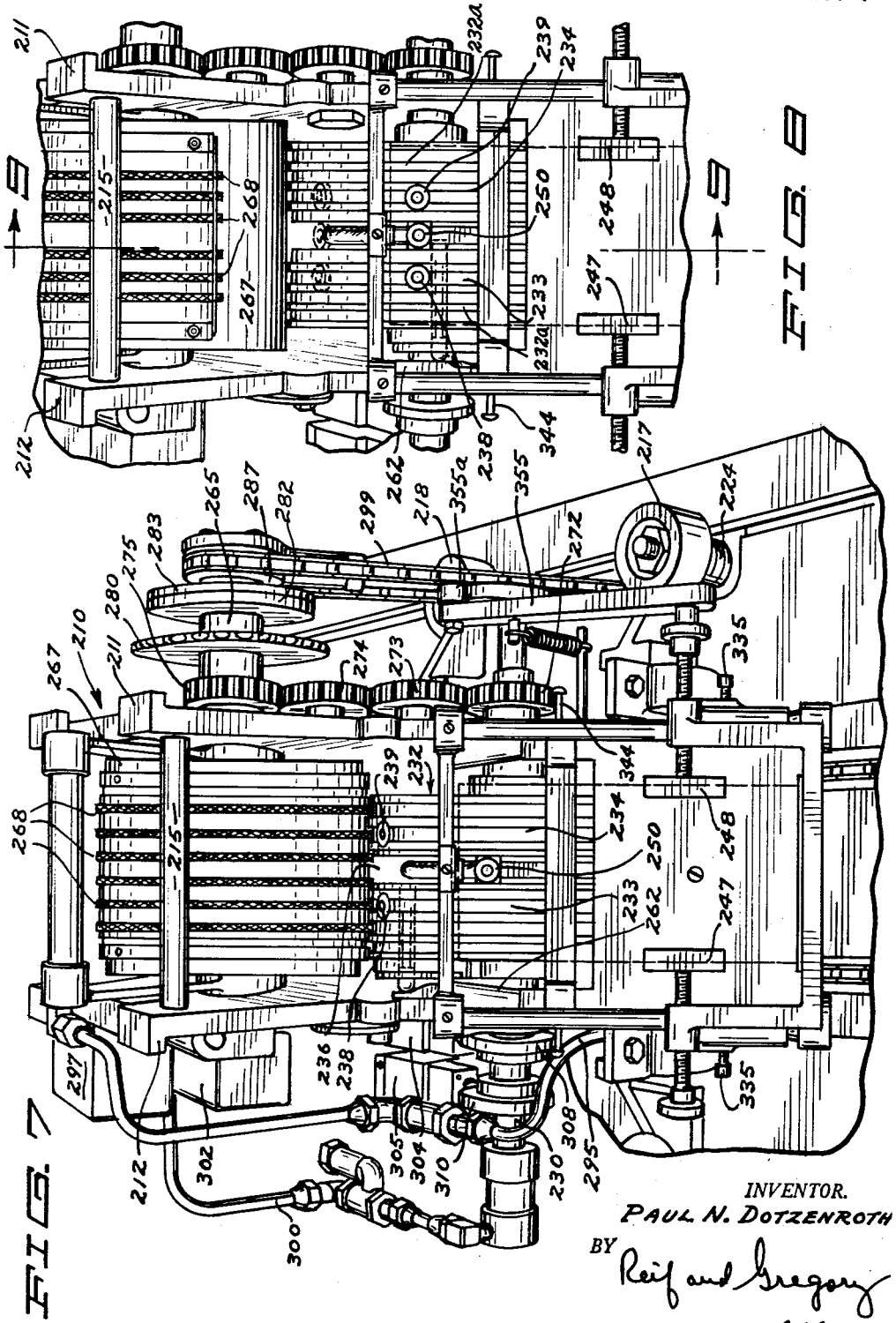

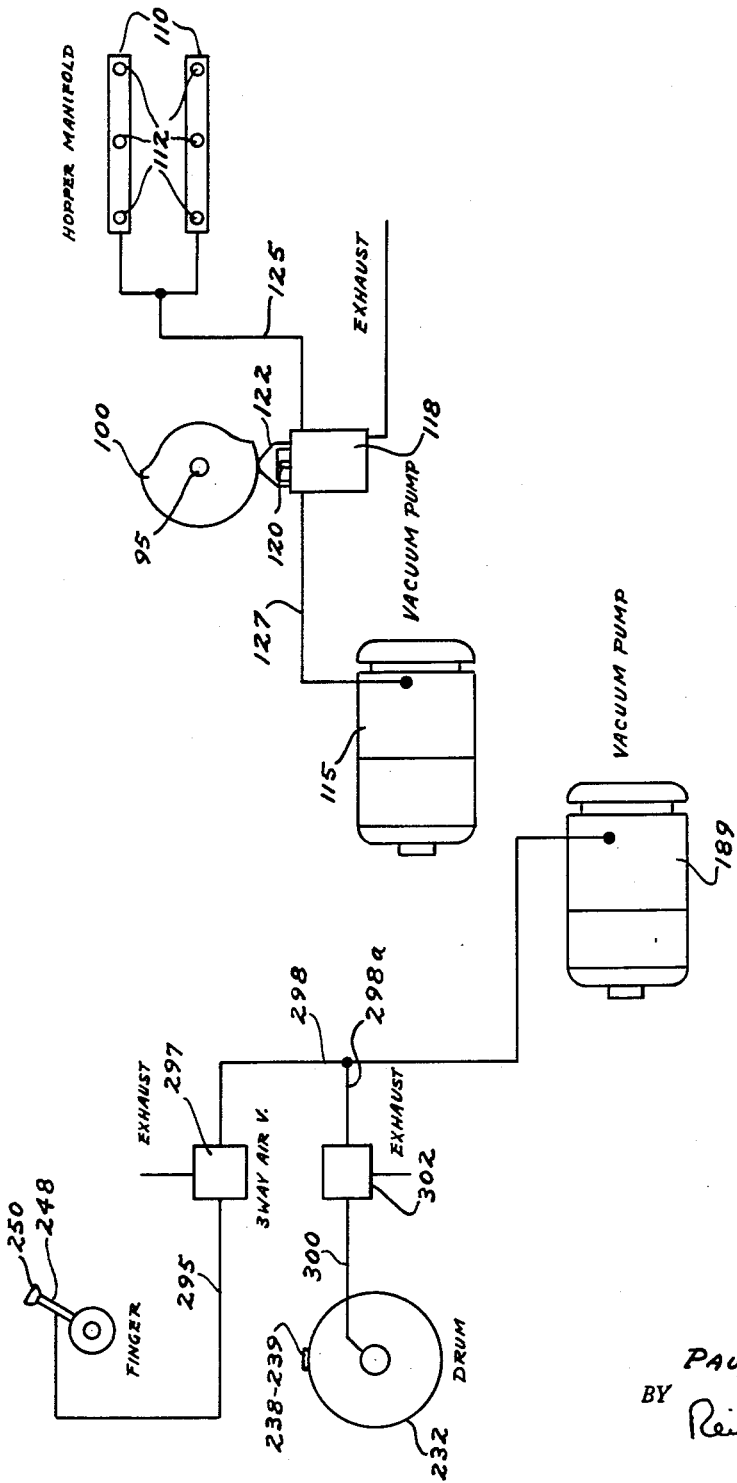

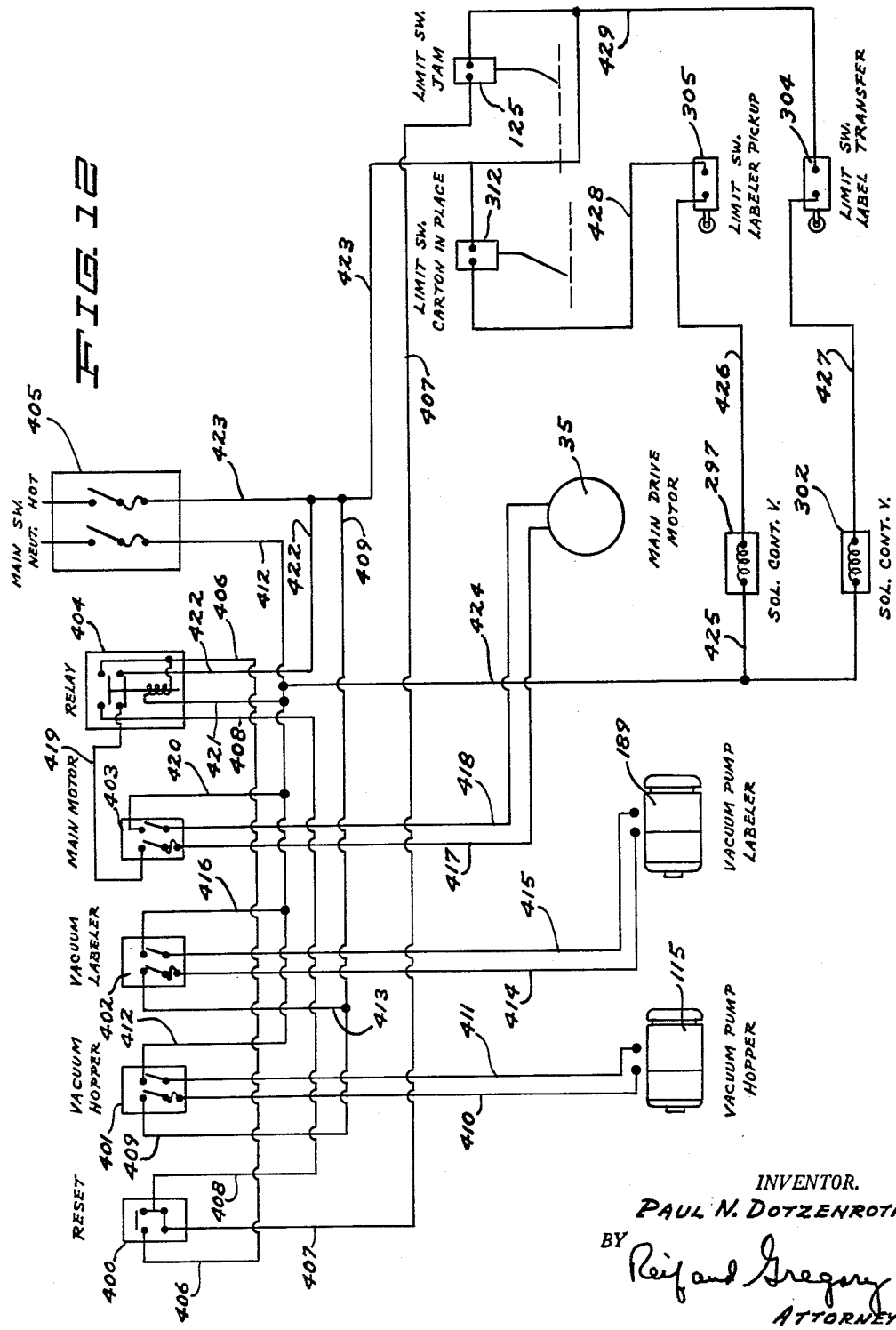

United States Patent Office 3,026,238
Patented Mar. 20, 1962

3,026,238
LABELING APPARATUS
Paul N. Dotzenroth, Minneapolis, Minn., assignor, by mesne assignments, to Baker Engineering Corp., Minneapolis, Minn., a corporation of Minnesota
Filed June 4, 1959, Ser. No. 818,077
8 Claims. (Cl. 156—571)

This invention relates to a device for applying labels to products, such as folders or containers of various kinds, such as envelopes having enclosures therein.

It is a common practice to manually feed products into an operative relationship with a device for the application of labels in order to secure exact register of the labels in relation to the products. In attempting to automatically feed such products into a labeling device, difficulty has been encountered in bringing the product and label into exact register whereby the label will be placed exactly in a designated or desired location on the product. In a high speed process when labels must be removed quickly from a stack and be moved quickly into position to be applied to a product, a considerable amount of slippage is present in the picking up of the label. In the hurry of the process it is not uncommon for pairs of labels to stick together. This problem is a common one where a suction means is used to remove the labels from a stack. In such an operation a considerable degree of suction must be created to positively grip a label, and quite often the effect of the suction extends through the leading label so that there is a tendency to pick two or more labels at a time. Thus there is a real problem in the art of automatically applying labels at high speed to be in exact register with products automatically fed thereto on which said labels are to be applied.

It is desirable therefore to have a device which would be adapted to operate at a high speed in applying labels in exact register onto products automatically fed thereto.

It is an object of this invention therefore to provide an automatically operated device adapted to apply labels at a high rate of speed in exact register onto products automatically fed thereto.

It is another object of this invention to provide a device adapted to remove labels singly from a stack of labels in an exact and positive manner for application of the labels in exact register onto a product automatically fed thereto.

It is a further object of this invention to provide a device comprising a drum for carrying labels, and means for transferring a label from a stack of labels to said drum, and more specifically to a certain position on said drum with said drum being in a cooperative relationship with a linear means for bringing a product into operative relationship with said drum for the application of said label to said product.

It is still another object of this invention to provide a device comprising a rotating drum for carrying a label and a linear conveyor in a cooperative relationship with said drum for conveying a product into an operative relationship therewith, means for removing labels singly from a stack of labels in a positive and regular manner for holding the same in readiness to be transferred to said drum, and means in association with said drum for receiving said label from said first mentioned means and holding the same securely on said drum for application to said product in exact register therewith.

It is a more specific object of this invention to provide a device comprising a rotating drum, an oscillating member having a suction head in operative relationship with said drum, a label rack, said oscillating member being adapted to remove labels from said rack in a positive non-slipping manner to hold said label in readiness to be transferred to said drum, a pair of suction heads on said drum adapted to come into alignment with said suction head, and all of said suction heads adapted to move in alignment with said drum for some distance of its travel, said pair of suction heads gripping said label, and said first mentioned suction head being inactivated to release its grip on said label, and said oscillating member and first mentioned suction head returning to starting position to pick up another label from said stack and said pair of suction heads and said drum carrying said label into position to be applied to a product automatically fed thereto, said label being applied to said product in exact register therewith.

These and other objects and advantages of the invention will be fully set forth in the following description made in connection with the accompanying drawings in which like reference characters refer to similar parts throughout the several views and in which:

FIG. 6 is a view on an enlarged scale taken on line 6—6 of FIG. 5 as indicated by the arrows;

FIG. 7 is a view of a portion of applicant's device in front elevation showing a relationship between the suction heads of the labeling head in a certain cycle and showing a part thereof in dotted line;

FIG. 8 is a view similar to the view in FIG. 7 on a somewhat smaller scale showing different relationships between the suction heads in a different cycle from that shown in FIG. 4 and showing in dotted line the relationship between said suction heads in still a different cycle;

FIG. 11 is a schematic showing the system of air lines; and

FIG. 12 is a schematic showing the electrical system.

Figure 1:
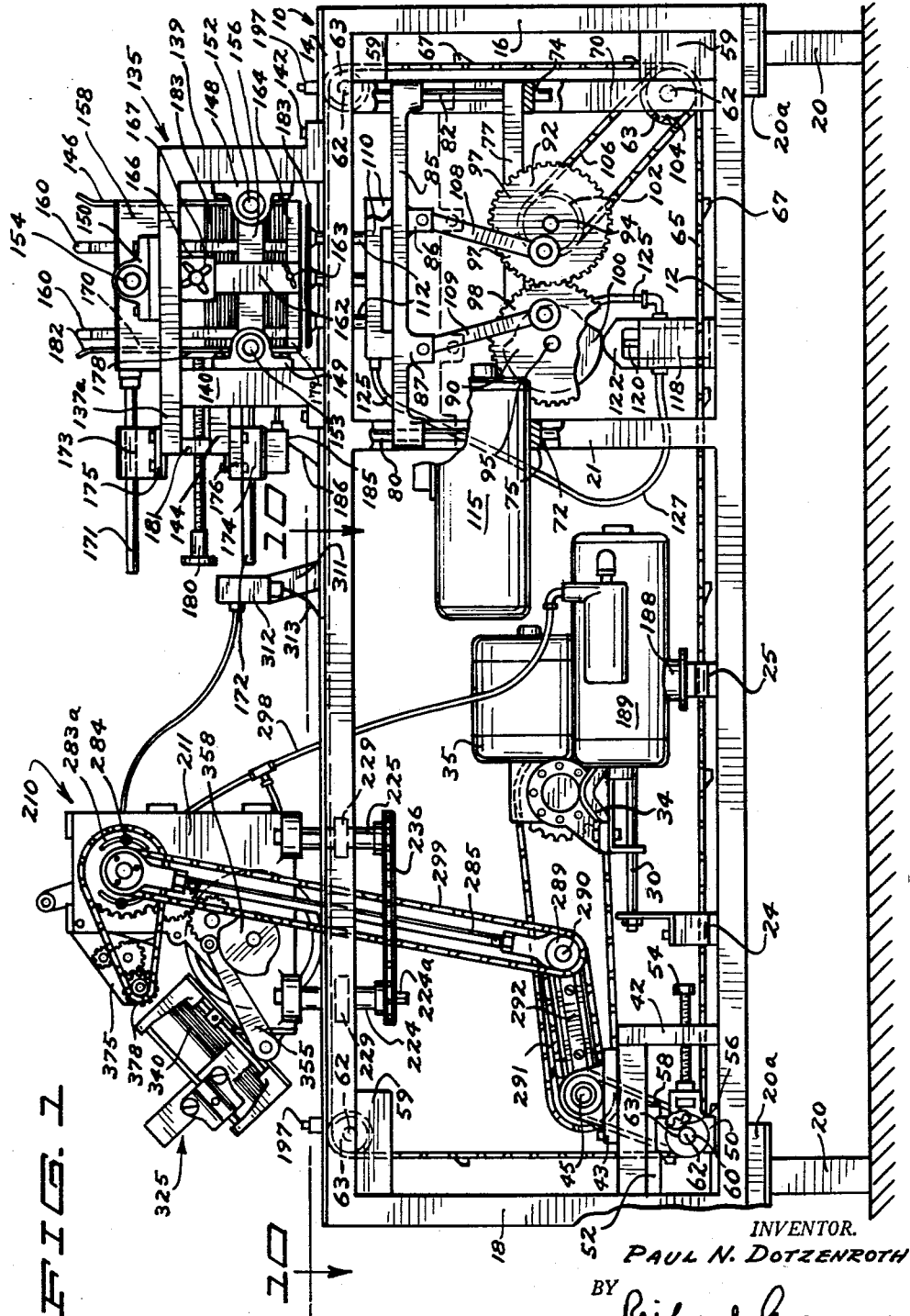
FIG. 1 is a view in side elevation of applicant's device on a reduced scale with some portions broken away and some parts shown in dotted line.

Referring to the drawings, in which like characters refer to identical parts throughout the views and with particular reference to FIG. 1, a frame member 10 is shown substantially in the form of a parallelepiped having spaced longitudinally extending bottom members 12 and top members 14, and extending vertically therebetween at either end thereof are end members 16 and 18. Said frame member may be made of any suitable material, such as angle iron. In the embodiment of the invention here presented, said frame members are indicated as being substantially rectangular in cross section. Supporting said frame 10 at each bottom corner thereof are legs 20 depending from a plate 20a secured to said frame, as by welding. Intermediate said end members 16 and 18 are vertical supporting members 21. When in finished operating condition said frame 10 may have its sides enclosed with removable hinged cover plates, such as end plate 23 indicated in FIG. 3.

Extending transversely of said members 12 are spaced cross members 24 and 25 having upstanding L plate brackets 26 and 27 at one side of said frame and being secured to said members 24 and 25 by bolts 28. Although not here fully illustrated, extending between said brackets 26 and 27 and shown secured thereto by nutted ends are transversely spaced parallel rods 30. Mounted on said rods 30 by having said rods extending through its apertured depending end portions is a U-shaped plate member 32 having an angle bracket 34 bolted thereto and extending upwardly therefrom to support a motor 35. Said motor is here indicated as being an electrical motor which will be connected to an appropriate source of energy.

Journaled between said brackets 26 and 27 is a screw rod 36 threaded through the depending end portions of said bracket 32. Said screw rod 36 has a hand wheel 37 secured to an outer end thereof whereby said motor supporting bracket 32 may be readily moved longitudinally of said rods 30 by said screw rod 36. A locking means such as a locking nut not here illustrated may be used in connection with said screw rod 36 to hold said rod from rotation in order to lock said bracket 32 in any desired position.

Extending transversely from said motor 35 is a stub drive shaft 38 having a plurality of variable drive sprockets 39 secured thereon.

Constructed at the forward end of said frame member 10 and raised from the bottom thereof is a transversely extending platform 41 secured as by welding at one side to said end members 18 and having upstanding supporting frame members 42 at its other side at either end thereof. Said members 42 will be secured to said bottom members 12 and to said platform 41, as by welding. Secured on said platform 41 at either end thereof are bearing blocks 43, and journaled in said bearing blocks and extending therebetween is a shaft 45. Secured to said shaft 45 is a sprocket 47. Passing over one of said sprockets 39 and 47 is a sprocket chain 49 whereby one of said sprockets 39 drives said sprocket 47.

Mounted beneath said platform 41 at either end thereof are bearing blocks 50 carried between vertically spaced guides 52 to provide for longitudinal adjustment. Said bearing blocks are respectively held in adjustable position by screw members 54 respectively threaded through the vertical supporting members 42. Thus said bearing blocks 50 and screws 54 form chain tighteners. Journaled in said bearing blocks 50 and extending therebetween is a shaft 60. Mounted on said shaft 45 adjacent said sprocket 47 is a sprocket 55. A sprocket 56 is mounted on said shaft 60 in vertical alignment with said sprocket 55 and passing over said sprockets 55 and 56 is a link belt 58.

As viewed in FIG. 1 with reference to said bearing blocks 50, spaced pairs of bearing equipped plate members 59 are secured adjacent each of the other corners of said frame 10. Respectively journaled between said plate members 59 are shafts 62. Respectively carried on said shafts 62 and on said shaft 60 are spaced pairs of sprockets 63. Respectively passing over said spaced pairs of sprockets are a pair of transversely spaced sprocket chains 65. Carried on said sprocket chains 65 in transverse alignment and longitudinally spaced thereon are lugs 67. Said sprocket chains 65 will be moved counterclockwise as viewed in FIG. 1.

Spaced inwardly of said member 16 and extending between members 12 and 14 at either side of said frame member 10 are vertically extending members 70. Extending transversely between said members 70 and between said members 21 respectively are horizontally extending members 72 and 74, as indicated in FIG. 1. Supported on said member 72 adjacent the near one of said members 21, as viewed in FIG. 1, is a plate bracket 75. Extending centrally longitudinally of said member 10 between said members 72 and 74 and being secured thereto is a frame or supporting member 77. Said member 77 is provided with enlarged end portions having sockets formed therein. Extending respectively transversely of said frame member 10 adjacent the top thereof and being secured thereto in vertical alignment respectively with said members 72 and 74 are a pair of frame members respectively having sockets formed therein in vertical alignment with and in opposed relation to said sockets formed in the ends of said members 77. Respectively secured between vertically aligned pairs of said sockets are shafts 80 and 82 forming guides. The structure above indicated in connection with said sockets is a common construction in common usage and specific illustration of the same is believed not to be necessary for an understanding of the applicant's structure. Mounted on said guides 80 and 82 for reciprocating movement thereon is a crosshead 85 having centrally spaced lugs 86 and 87 depending therefrom.

Gear blocks 90 and 92 depend from said member 77 in being spaced substantially centrally thereof and having stub shafts 94 and 95 respectively journaled therein. Secured to said shaft 94 is a gear 97, and secured to said shaft 95 is a gear 98 adapted to be engaged by and driven by said gear 97. Secured to said shaft 95 at one side of said gear 98 is a cam gear 100. Secured to said shaft 94 at one side of said gear 97 is a sprocket gear 102. Mounted on the shaft 62 in the lower right-hand corner of said frame 10, as viewed in FIG. 1, is a sprocket gear 104. Passing over gears 104 and 102 is a sprocket chain 106. Pivoted to off center positions of said gears 97 and 98 respectively are arms 108 and 109 being pivoted respectively at their other ends to said lugs 86 and 87. Carried on said crosshead 85 is an inverted substantially U-shaped member 110 having parallel passages through the upper portion thereof communicating with a plurality of spaced cylindrical suction heads 112 upstanding therefrom and shown here to be three in number for each of said passages.

Mounted on said plate bracket 75 is a vacuum pump 115. This is a common and ordinary type of vacuum pump well known in the art. Carried on a frame member 12 at the far side of said frame member 10, as viewed in FIG. 1, is a valve casing 118 having a passage therethrough normally closed and having a spring pressed valve stem 120 adapted to be depressed to open said passage by the reciprocating cap member 122 adapted to be actuated by said cam 90. The passage through said casing 118 is connected at one end by tube 125 to said vacuum pump 115, and at its other end is connected by tube 127 to said member 110 for creating suction in said suction heads 112. The valve casing 118 and the structure therein in connection with the passage therethrough is a common ordinary well known construction for which no novelty is claimed, and it is not believed that any further illustration is necessary.

Mounted atop said frame 10 adjacent the rear end thereof is a product hopper 135 adapted to hold material to which labels are to be applied. Said hopper may take various forms. In the embodiment of the invention here indicated, said hopper is shown as having an outer frame substantially parallelepiped in form having a width substantially the width of said frame member 10 and having a top frame portion 137 with spaced pairs of legs 139 and 140 supporting said top 137 and being secured to said frame members 14 by bolts 142. Said legs 140 at the front of said hopper are set back somewhat from the front edge of said top 137 to form an overhang portion 137a. Spaced directly below said overhang portion 137a is a similar portion 144 secured as by welding to said legs 140.

Said hopper 135 has a cage therein having a stationary rear wall formed of transversely spaced vertically extending slats 146. Said slats are secured to the inner side of the rear of said hopper 135 and the upper end portions of said slats are inclined outwardly as indicated.

The inner side walls of said hopper are adapted to be moved towards and away from one another to accommodate different widths of products to be placed therein, and the inner front wall of said hopper is adapted to be moved longitudinally of said hopper between said side walls. The width of said front wall will determine the closeness with which the side walls can be brought together. Said side walls are identical in construction with only one of the same being shown as viewed in FIG. 1.

Carried on the inner sides of said legs 139 and 140 in facing relation are bushing blocks 148 and 149 with bushings therein, and a bushing block 150 of similar construction is secured to the top 137 of said hopper centrally of and in the plane of said blocks 148 and 149. Carried respectively in said bushing blocks 148, 149 and 150 and slidable through the bushings thereof are shafts 152, 153 and 154 forming guides. Secured to the inner ends of said shafts 152 and 153 is a horizontal frame member 156. Secured to the inner end of said shaft 154 is a horizontal frame member 158 similar to said member 156. Said members 156 and 158 are connected by transversely spaced vertically extending slats 160. Extending centrally vertically of said members 156 and 158 and being secured thereto and extending somewhat below said member 156 is a plate member 162 having removably secured thereto by a thumb screw 163 a bar 164 substantially rectangular in cross section and parallel to said member 156 forming a ledge for support of material in said hopper 135. Threaded through a supporting plate 166 depending from the side of said top 137 centrally thereof is a hand operable screw 167 secured at its inner end to said plate 162 for adjustable movement of said plate transversely of said hopper 135.

The movable front of said hopper 135 is similar in construction to the side above just described comprising vertically spaced horizontal channel members 170, with only the upper one being indicated in FIG. 1. Said members 170 are secured to the inner ends of shafts 171 and 172 which form guides and are movable through the bushings in bushing blocks 173 and 174 secured by brackets 175 and 176 to portions 137a and 144 respectively. Said bushing blocks are in vertical alignment as here indicated. The upper and lower members 170 are connected by a vertical central plate 178 which has secured thereto for movable adjustment thereof longitudinally of said hopper a hand operable screw 180 threaded through a plate 181 secured between said portions 137a and 144 at the front end portions thereof. Secured to the bottom of said plate 178 is a ledge-forming supporting member 179 similar to said member 164 and is movable longitudinally of said hopper 135 between the inner sides thereof to adjust the size of the opening in said hopper. Thus material in said hopper is supported by ledge-forming members at either inner side and at the inner front thereof. Material is indicated in said hopper by the character 183. The leading element of this material is indicated as being withdrawn from said hopper by the suction heads 112, as indicated in FIG. 1.

Depending from said bushing 174 is an electrical jam switch 185 connected to said motor 35, as indicated in the schematic drawing in FIG. 11, and has depending therefrom a switch actuating member 186. Said member 186 will be positioned to have its lower end just above the height of a single piece of material withdrawn from said hopper 135 and carried on said conveyor 65. If two pieces of material are stuck together and are deposited on said conveyor in this condition, the upper of said pieces will contact said member 186 and trip the same, which member will actuate said switch 185 and break the circuit carrying current to said motor 35 and will thus stop the system from operating.

Supported on a concave plate bracket 188 carried on said cross member 25 is a vacuum pump 189. Said vacuum pump is of a common and ordinary variety well known in the art.

Overlying said frame member 10 to form a top surface thereof is a plate member 190 supported by cross frame members thereunder not here shown, and has formed therein a pair of parallel spaced slots 191 running centrally longitudinally thereof through which slots pass the link chains of said conveyor 65. Adjacent the outer sides of said slots 191 and extending the full length of said frame member 10 are guide members 192 and 193 each having pivoted thereto by bolts 196 a pair of longitudinally spaced arms 194 and 195 respectively, said arms being pivoted at their other ends by bolts 197 to said plate 190 at points spaced somewhat away from said guide members. Hence said guide members may be moved toward or away from one another to adjust the spacing therebetween by longitudinal movement thereof, as is made evident by the illustration thereof in FIG. 3. The rear of said arms 194 and 195 are not here shown.

Carried atop said frame 10 adjacent the forward end thereof is a labeling head 210 formed of spaced side plates 211 and 212 generally rectangular in form but having lower forwardly extending portions of decreasing height. Said side plates are held in spaced relation by a plurality of spacing rods 215, of which one is shown as indicated in FIG. 7, and a back plate member not here illustrated. Said back plate member has no particular significance and it is believed that specific disclosure of it is not necessary. Said labeling head is spaced over said conveyor 65.

Secured to said labeling head 210 in a suitable manner at each lower corner thereof and extending outwardly therefrom are brackets 217, 218, 219 and 220 respectively having horizontally disposed hub portions at the outer ends thereof having the upper ends of vertical adjustment screws 224, 225, 226 and 227 respectively journaled therein. Said adjusting screws are threaded through supporting lugs 229 secured as by welding to frame members 14. Carried at the lower ends of said adjusting screws are horizontally disposed sprockets 234 having a sprocket chain 236 passing thereabout. Said screw 224 has a depending lug 224a adapted to be engaged by a crank or a wrench for rotation to rotate all of said screws for vertical adjustment of said labeling head.

Mounted in the lower forward portion of said labeling head on a shaft 230 is a drum 232. Said drum may be variously formed, but is here shown as a split drum having spaced portions 233 and 234 forming a groove 236 therebetween. Said portions are indicated in FIG. 6 as having a cut out portion forming an area of reduced dimension between the rim and hub portions thereof. The surface of said drum is indicated as having shallow spaced ribs 232a thereabout. Said shaft is adapted to have a passage 230a extending therein from the right-hand end thereof, as viewed in FIG. 6. Extending outwardly from said passage are radial passages 233a and 234a respectively extending to the peripheries of said drum portions 233 and 234. Substantially flush with the outer surfaces of said drum portions at the outer ends of said passages are suction heads 238 and 239 preferably having resilient outer tip portions, as of rubber. Said passages and said suction heads will be positioned to place said suction heads in transverse alignment. Said shaft 230 is journaled in bearings 241 and 242 respectively carried in said side plates 211 and 212. Said shaft extends outwardly at either side of said plates.

Journaled on said shaft 230 by a hub portion 245 having bearings 246 therein is a radially extending arm 248 having a passage 248a extending longitudinally through an outer end portion thereof terminating in a suction head 250 positioned to be flush with the outer surface of said drum 232. Connected to said passage 248a is a flexible conduit 252 extending partially about said hub 245 beneath said drum 232 for communication with said vacuum pump 189, as will be hereinafter described. Extending across the lower front of said labeling head 210 and secured thereto is a plate member 254. Means are provided for retractingly holding said arm 248 in one position. As here disclosed said means comprises a coil spring 256 connected at one end to said plate member 254 by a hook 255 and having its other end connected by a hook 257 to said arm 248. Inclined upwardly and inwardly from said plate member 254 centrally thereof is a stop member 258 formed of rigid strap material whereby said arm 248 is normally held under tension of said spring 256 against said stop member.

A pin 260 forming a detent is disposed in a passage 233b extending transversely through a rim portion of drum section 233. Said detent and passage are respectively enlarged at either end thereof with a spring 261 seated in said passage adjacent the outer side of said drum section 233 for normally urging said detent to extend outwardly of said drum at its outer side and be flush with its inner side. An arc-shaped cam plate 262 adapted to be engaged by said detent is secured to the inner side of plate member 212 whereby for a certain extent of the rotation of said drum 232 said detent is urged by said cam plate to extend outwardly of the inner side of said drum section 233 to engage said arm 248.

Figure 9:
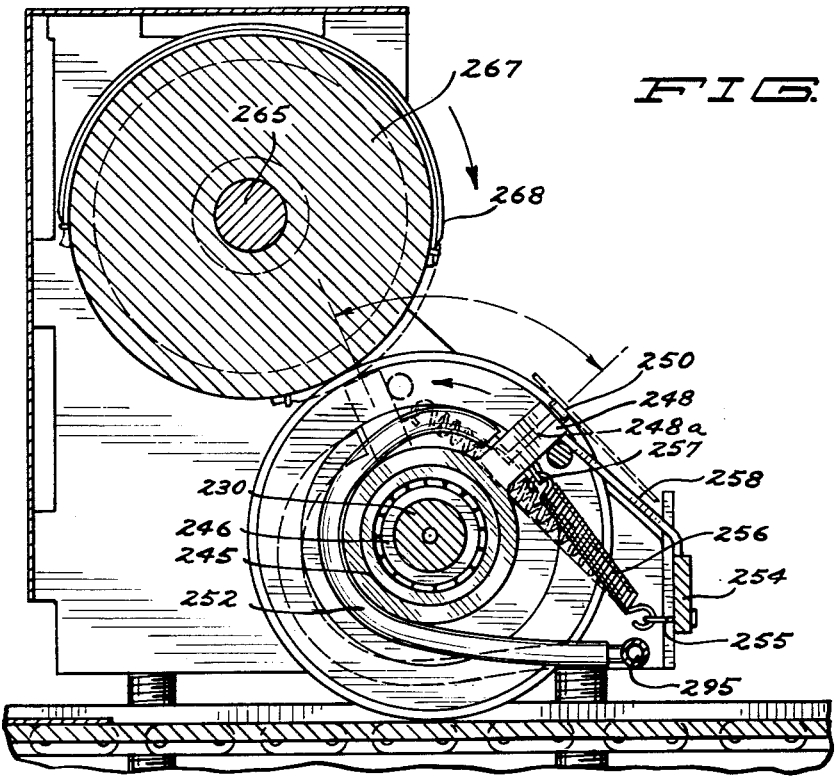
FIG. 9 is a view in vertical section taken on line 9—9 of FIG. 8 as indicated by the arrow, showing in dotted line the advanced position of the central arm and suction head thereon.
Figure 10:
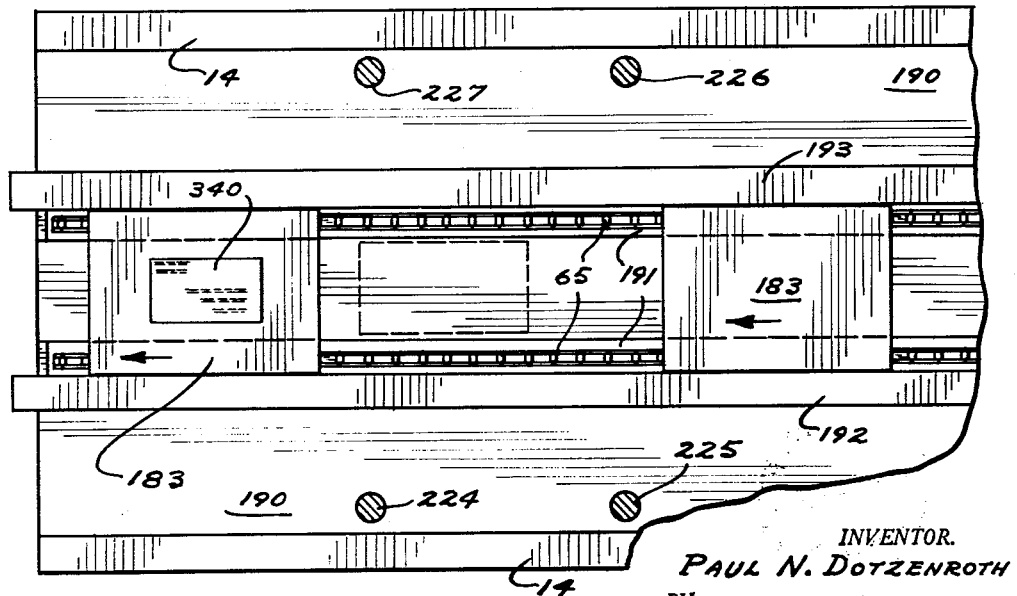
FIG. 10 is a top plan view of a conveyor portion of applicant's device with objects thereon taken on line 10—10 of FIG. 1, as indicated by the arrows.

Journaled between an upper portion of said labeling head 210 in bearings 263 and 264 seated in said side plates 211 and 212 respectively is a shaft 265 having an end portion extending outwardly of said plate 211. Secured on said shaft 265 is a drum 267 adapted to engage said drum 232. Said drum 267 has a plurality of transversely spaced resilient strips 268 extending partially thereabout, as indicated in FIG. 9. Said strips are spaced transversely to be aligned between said ribs 232a and to engage labels carried on said ribs as will hereinafter be described. Pivoted to said shaft 265 about said bearings 263 and 264 is a U-shaped handle 270 of a common and well known construction.

Mounted on the outer side of side plate 211 is a train of gearing comprising gears 272, 273, 274 and 275 respectively secured on shafts 230, 277, 278 and 265. Secured to said shaft 265 and spaced outwardly of said gear 275 is a sprocket gear 280. Spaced outwardly of said sprocket gear 280 and integral with said shaft 265 is a circular plate 282. Mounted freely on said shaft 265 is a mating plate 283 having arcuate slots therein with screws 284 extending through said slots into plate 282 whereby an adjustable coupling is formed. Journaled on the outer end of shaft 265 is the upper end of a tensioning rod 285 having a sprocket 287 journaled thereon and said sprocket is integral with plate 283. Hence said plates 282 and 283 are secured together for a driving relationship between sprocket 287 and shaft 265. Said plate 282 is integral with said drum 267 whereby circumferential adjustment between plates 282 and 283 by means of said slots permits an adjustment of the strips 268 on said drum 267 in relation to said drum 232. Said tensioning rod 285 carries a shaft 290 journaled at its lower end with sprocket 289 secured to said shaft. Having an elbow connection with said tensioning rod 285 is a plate member 292 carrying a sprocket 293 journaled to one end thereof and secured onto said shaft 290. Said plate member 292 has a sprocket gear 294 journaled at its other end and secured onto shaft 45. A sprocket chain 291 passes over gears 293 and 294, and a sprocket chain 299 passes over gears 287 and 289.

Connected to the flexible conduit 252 by a straight run beneath said drum 232 transversely thereof is a conduit 295. Said conduit 295 communicates with an air valve 397 secured to side plate 212. A conduit 298 connects said valve 297 with vacuum pump 189. A conduit 300 is connected to shaft 230 for communication with passage 230a therein and connects said passage with an air valve 302 mounted somewhat below said valve 297. A conduit 298a connects said valve 302 with conduit 298 for communication with vacuum pump 189. Said valves 297 and 302 are commonly used three-way type solenoid controlled air valves. Normally air at atmospheric pressure is present in the passages.

Figure 2:
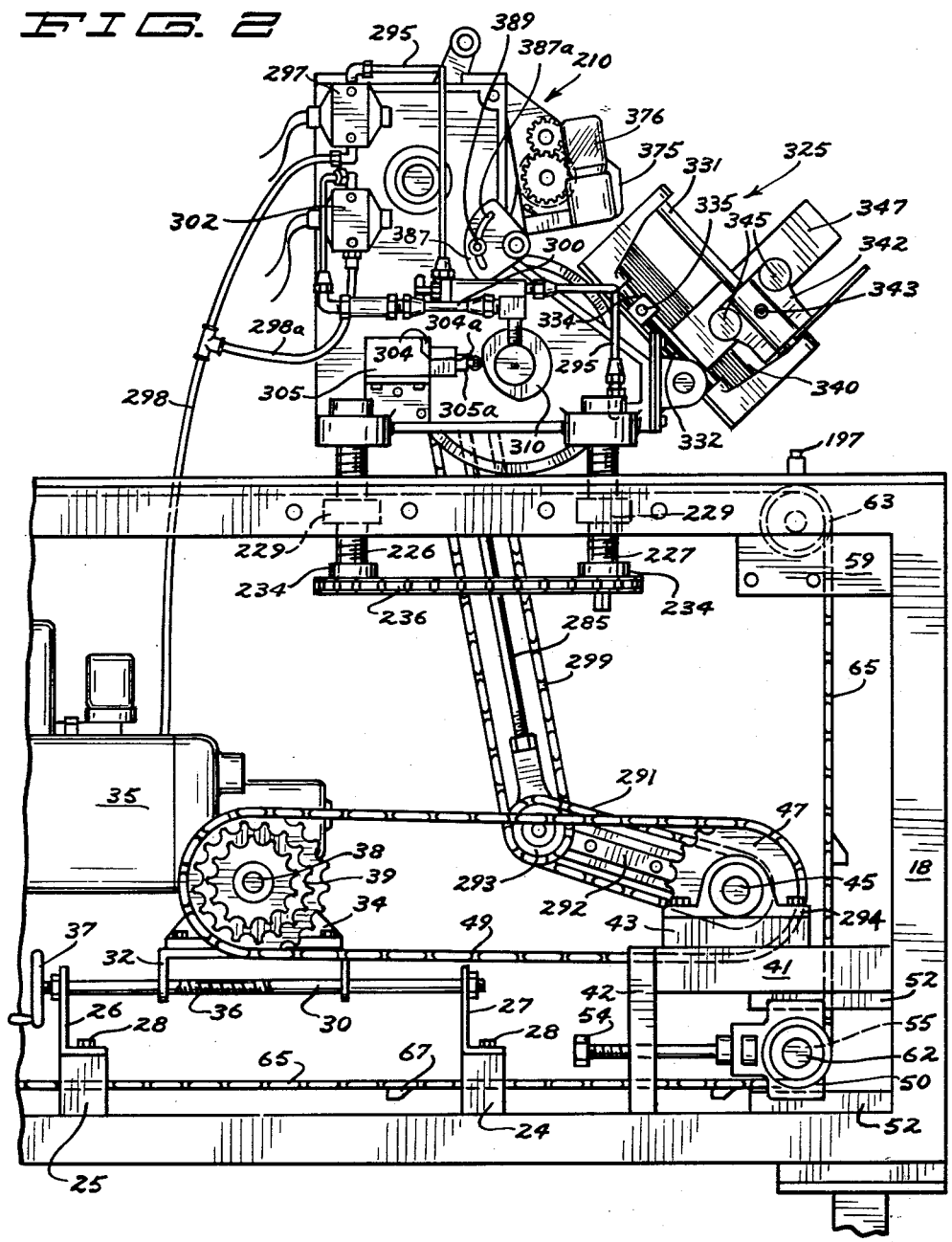
FIG. 2 is a view in side elevation of a portion of applicant's device with some portions shown in dotted line and some portions being broken away.

Mounted in a side by side relation to side plate 212 are electrical switches 304 and 305 respectively having forwardly extending switch actuating members 304a and 305a which are normally urged outwardly with said switches being normally in open condition. Said switch actuating members are indicated in FIG. 2. Switch 304 will be connected to valve 302 and said switch 305 will be connected to valve 297.

Mounted on shaft 230 in alignment respectively with switches 304 and 305 are cams 308 and 310 adapted to respectively actuate switch actuating members 304a and 305a. The cam 310 is operatively coordinated with arm 248 and suction head 250 and also with cam plate 262. Said cam gear 310 is adapted to actuate switch 305 which in turn actuates valve 297 to have suction created to suction head 250 from the point at which said suction head picks up a label from its position shown in FIG. 3 through its travel with drum 232 by its engagement by detent 260 to the point of its disengagement by said detent 260 at the end of the cam portion of plate 262 at which point the vacuum at suction head 250 is broken and arm 248 is returned to starting position.

Said cam 308 is operatively coordinated with suction heads 238 and 239 in drum 232 and is adapted to actuate switch 304, which switch in turn actuates valve 302 to create a suction at said suction heads from the point at which said suction heads come into alignment with said suction head 250 at its starting position to the point where the label carried by said suction heads is transferred to the product to be labeled, as will be described.

Secured to an upstanding plate bracket 311 on frame member 14 at the near side of said frame 10, as viewed in FIG. 1, is an electrical switch 312 having a depending switch actuating finger 313 adapted to be engaged by a product 183 moving on conveyor 65 and being connected to valve 297 to energize said valve.

Mounted on the forward end of said labeling head 210 is a label rack 325 here shown comprising a rectangular plate member 326 forming its bottom with substantially the forward half of said plate member being cut out and leaving only a framework, and having substantially U-shaped end members 327 and 328 secured thereto, and having a pair of vertically spaced guide rods 329 and 330 extending therebetween at one side thereof, and a pair of similar guide rods 331 and 332 in respective horizontal alignment with said guide rods 329 and 330 at the other side thereof. In the cut out portion of said bottom transversely thereof is a bar 334 having upstanding ends bored to receive said guide rods 330 and 332 therethrough and be slidable thereon and having set screws 335 to secure its position on said guide rods. Said bar 334 forms a support at the bottom of said rack in the cut out portion thereof for the forward end portions of labels 340 stacked in said rack.

Figure 3:
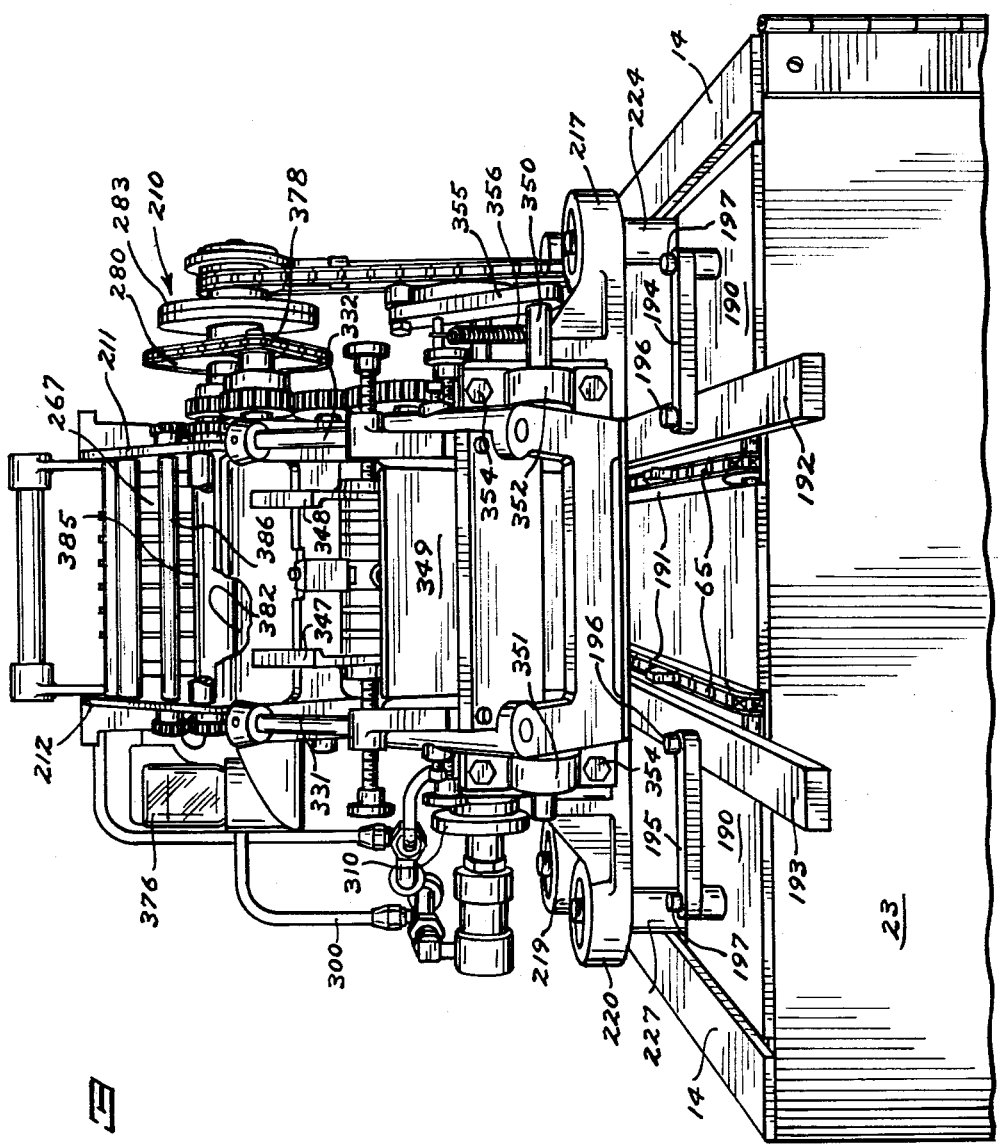
FIG. 3 is a view in front elevation of a portion of applicant's device with a portion thereof being broken away.
Figure 4:
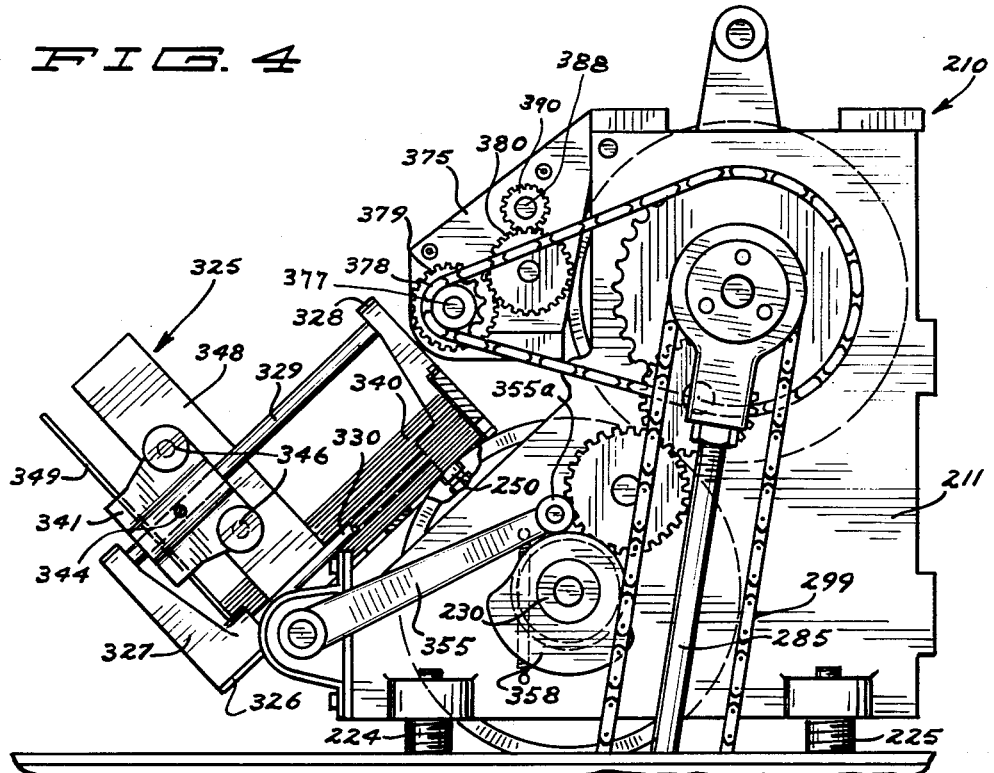
FIG. 4 is a view in side elevation of a portion of applicant's device with the labeling head thereof shown in one operating position and with a portion broken away and some parts shown in dotted line.
Figure 5:
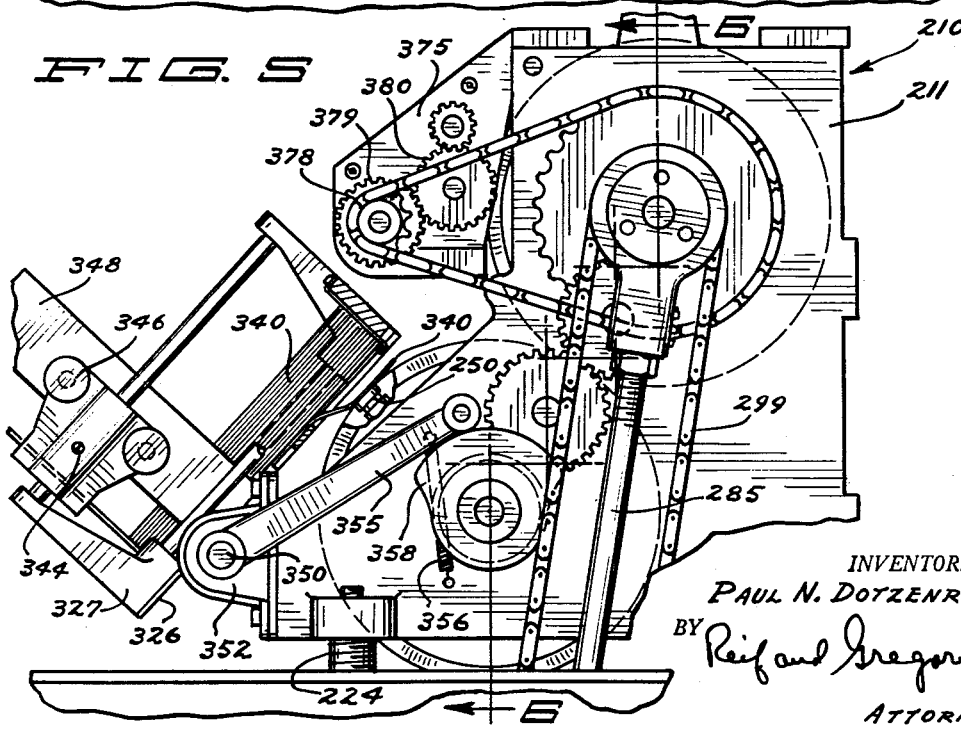
FIG. 5 is a view in side elevation of a portion of applicant's device similar to FIG. 4 with said labeling head shown in a different operating position.

Slidable on the upper pair of said guide rods 329 and 331 are brackets 341 and 342 respectively having bored cylindrical body portions through which said guide rods are disposed. Said brackets have set screws 343 and 344 to engage said guide rods. Said body portions each have upwardly and downwardly extending flanges. Said bracket 342 will have hand operable screws 345 disposed through its flange portions inwardly at right angles to the axis of said bracket, and said bracket 341 will have a similar pair of flanges with screws 346 extending therethrough in a facing relation with said screws 345. Respectively carried on the inner ends of said screws are vertically extending plates 347 and 348. The inner ends of said screws will be respectively journaled in said plates whereby said plates may be adjusted toward and away from one another. A vertical backing member 349 will be secured to the rear of said brackets 341 and 342 extending therebetween and movable therewith longitudinally of said rack 325. Extending transversely of said rack 325 across a rear bottom portion thereof is a shaft 350 journaled in bearing brackets 351 and 352 at either side of said rack with said bearing brackets adapted to be secured by bolts 354 to the forward end portion of said rack 325 overlying said plate member 354. An arm 355 is secured to an extended portion of said shaft 350, as shown in FIG. 3, to be integral therewith, and a coil spring 356 has one end secured to the free end of said arm with the other end of said coil spring being secured to said side plate 211 to hold said arm under tension in a forward downward position whereby said rack is tilted forwardly to have the open portion of its bottom and the leading label therein in contact with suction head 250.

Carried on an extended portion of said shaft 230 outwardly of side plate 211 is a cam 358 adapted to engage the cam follower 355a of said arm 355 and tilt the same upwardly and rearwardly to move said rack away from said suction head 250. Thus said spring 356 and cam 358 act to oscillate said label rack.

Adapted to be mounted in operating position on said labeling head 210 is a gluing apparatus. Said apparatus may be variously formed, but is of a common and well known construction comprising a receptacle 375 forming a glue well in its bottom portion and having its upper portion formed to extend about and be supported by said bar 215. An inverted container 376 containing a supply of glue will be carried in said receptacle, as indicated in FIG. 3, to feed said glue well. A sprocket gear 378 is journaled to one side of said receptacle 375 mounted on a shaft 377 extending through said receptacle and having a sprocket chain for driving the same passing thereover and over sprocket 280. Mounted on said shaft is a roller 382 rotating through the supply of glue and having toothed gears 379 secured thereto at either end thereof outwardly of said receptacle to mesh with gears 380 attached to the extended end portions of a transfer roller 385 carried in said receptacle 375 transferring glue from said roller 382 to said drum 267. Said roller 382 will have the commonly used doctor blade in connection therewith though not here shown. A third roller 386 is mounted on a shaft 388 journaled in said receptacle having gears 390 at either outer end thereof driven by said gears 380. Said roller 386 spreads the glue over the strips 268 and controls the thickness of the glue thereon. A wing-shaped bracket 387 is pivoted to side plate 212 and adapted to engage said receptacle 375. Said bracket has an arcuate slot 387a therein with a set screw 389 disposed through said slot to be secured in said side plate. Thus said bracket may be swung outwardly to adjust the position of said receptacle 375 in connection with said drum 267.

With reference to FIG. 11, the air line system of applicant's device is shown indicating the operative relationship between the vacuum pump 115 and the hopper manifold 110 and the operative relationship between the vacuum pump 189 and the suction heads 238, 239 and 250.

With reference to FIG. 12, a wiring diagram of the electrical system of applicant's device is shown. The operative function of jam switch 125 is indicated. Said switch is connected to the reset switch or breaker 400 by line 407 and to the main switch 405 by line 423. The carton in place switch 312 is connected by line 428 to switch 305 to energize the same, which in turn actuates the solenoid air valve 297 being connected thereto by line 426.

The label transfer switch 304 is connected by means of line 427 to the solenoid air valve 302. The action of said solenoid air valves 302 and 279 is coordinated as is indicated in the description of the operation of the device.

The legend "vacuum hopper" refers to the product hopper 135, and the legend "vacuum labeler" refers to the label head 210.

It is believed that in view of the above explanation the remainder of the wiring diagram is self explanatory.

In operation, the labeling head 325 will first be loaded with a stack of labels 340 with said labels facing downwardly. The bottom bar 334 will be adjusted for longitudinal position to hold the labels in position, side plates 347 and 348 will be adjusted for width and the back plate 349 will be moved forwardly for length so that the labels will be held very nicely in position. The product hopper 135 will next be loaded with the material to which said labels will be applied. The material in said hopper is loaded facing upwardly. The movable sides of said product hopper will be adjusted in accordance with the size of the product contained therein. This adjustment is quite obvious. The motor 35 will be turned on to drive the conveyor 65 and the related driven parts. The vacuum pumps 115 and 189 will be turned on to be in operating condition. Said drums 232 and 267 will rotate continuously. The strips 268 on said drum 267 will be positioned on the surface thereof relative to said drum 232 by means of adjustment plate 283 to have said strips ride over and engage the labels carried on said drum to apply glue to said labels. The suction head 250 will be in its starting position urged against stop 258 by the spring member 256, as indicated in FIG. 3. The cam 358 will be rotated by shaft 230 moving said label rack towards and away from contact with suction head 250. As said labeling rack is brought into contact with suction head 250 the cam 310 will begin to actuate the switch 305 which will actuate valve 297 to create suction at the suction head 250.

At this time the conveyor 65 is moving, being driven by said motor 35, and said conveyor in turn drives the gear 97 by means of the sprocket chain 106. Said gear 97 drives gear 98 and in cooperation said gears reciprocate arms 108 and 109, which through connecting structure reciprocate the suction heads 112 to bring them into contact with the leading element of the products loaded in the hopper 135. Carried on the shaft 95 on which said gear 98 is secured is cam 100 which actuates valve 118 which in turn controls the suction at the suction heads 112. This operation is timed so that suction is created at the suction heads 112 the instant they contact the leading elements of the products. Said suction heads pull the leading element downwardly out of the bottom frame of said hopper 135 and said product is brought to rest on conveyor 65, at which point the suction is broken. The lugs 67 on said conveyor 65 engage the product to move the same forwardly. If by accident more than one product is pulled down out of the hopper, the jam switch 185 will be actuated and shut down the system. This switch is unaffected with a normal operation. The product is then moved forwardly to engage switch 312. This is timed so that said switch 312 will be engaged during the same time that the cam 310 is actuating the switch 305. The switch 312 energizes the switch 305 and switch 305 actuates the valve 297 to create suction at said suction head 250. This is an intermittent operation in accordance with the embodiment of the invention here disclosed whereby a label will not be withdrawn from the supply of labels by suction head 250 unless a product is coming through on the conveyor. In practice the passage of a product past the switch 312 is of a sufficient length of time to energize the switch 305 to maintain suction at the suction head 250 for the length of time required for said suction head to perform its operation, as will now be described. With suction provided at the suction head 250, said suction head will grip the lowermost label and hold the same as said rack is oscillated away from said suction head by action of said cam 358. As said label is pulled free by being held by said suction head 250, the suction heads 238 and 239 are brought around by said drum 232 to be in transverse alignment with said suction head 250.

At this instant the cam gear 308 actuates the switch 304 which actuates the valve 302, which in turn creates suction at the suction heads 238 and 239. At this instant all three of the suction heads are gripping the label. Thus the label is held in a waiting position for the arrival of suction heads 238 and 239. The detent 260 at this time is pressed inwardly by the cam plate 262 to engage the arm 248 whereby as said drum 232 continues in rotation, said arm 248 and suction head 250 rotate therewith in alignment with said suction heads 238 and 239. All three suction heads continue to grip the label to the end of the cam portion of cam plate 262, at which point said detent 260 is urged away from said arm 248. At this instant the cam 310 has moved about to the point of disengagement from said switch 305 whereby the suction is broken at the suction head 250 and said arm 248 is snapped to its starting position by spring 256. At this point another cycle commences with the picking up of a label. If suction cup 250 fails to pick up a label, then said strips 268 will ride through the space between said ribs 232a and there will be no application of an adhesive made to affect said roller 232.

Said drum 232 continues its rotation, glue is applied to the strips 268 by the transfer roller 385 and said glue is applied to the label by rotation of said drum 267. As said label is carried to the bottom of said drum 232, the product 183 is brought into register therewith on conveyor 65, and at the instant of application of said label to said product, the cam 303 is disengaged from the switch 304 which inactivates the valve 302 to break the suction at the suction heads 238 and 239. Suction is restored to said suction heads 238 and 239 the instant they are brought into alignment with the suction head 250, as previously described.

There is a precise coordination between the linear movement of the product and the rotative movement of the label applied thereto. Exact register is made possible by the fact that a label is in a waiting position to be picked up by the suction heads on said drum, and the arm holding said label rotates with the drum for a sufficient distance to transfer the label to the suction heads integral with said drum. Thus there is no grasping for a stationary label while the drum is in motion, which type of action tends to result in slippage and inaccurate register. In the disclosure here made, applicant's device is described as providing a label for application with each complete rotation of the drum 232. This may readily be modified so that more than one label may be applied to a product during the course of a single rotation of said drum either by speeding up the process or by enlarging the drum, or a combination of both.

Thus it is seen that I have provided a very efficient device for the high speed application of a label to a product, with the product being automatically conveyed to the label and the label being applied thereto in exact register therewith. Applicant's device is in commercial production and has proved to be very successful in actual operation.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A labeling device having in combination, an oscillatable rack for holding labels, a rotating drum for carrying said labels, an arm in an initial stationary operating position having a suction head at its outer end within the periphery of said drum carried centrally radially of said drum, means for moving said rack to have a label thereon brought into contact with said suction head to have said suction head grip said label for a certain length of time, a pair of transversely spaced suction heads on said drum, means for moving said drum to move said pair of suction heads into transverse alignment with said first suction head to grip said label, a detent carried by said drum, means for urging said detent into engagement with said arm to cause said arm to rotate with said drum for a certain distance in transverse alignment with said suction heads, and means for causing said first suction head to release said label and return to said initial operating position.

2. A labeling device having in combination, a rack for holding labels, a rotating drum for carrying said labels, a suction head mounted in said drum for independent radial movement for gripping and withdrawing a label from said rack while in an initial stationary position and holding the same at the surface of said drum, means for oscillating said rack into operative contact with said suction head directly towards and away from the same, a pair of suction heads integral with said drum at either side of said first suction head, means for rotating said drum independent of said first mentioned suction head to transversely align said pair of suction heads with said first suction head, means for rotating all of said suction heads with said drum in transverse alignment for some distance, means causing said pair of suction heads to grip said label, and means for causing said first suction head to release said label and return to its initial position independent of the rotation of said drum with said drum in continuous rotation carrying said label.

3. A labeling device having in combination, a rack for holding labels, a rotating drum having axially spaced portions for carrying said labels, a suction head in an initial stationary position radially mounted between said portions for movement independent of said drum for gripping and transferring a label from said rack to said drum, means for moving said rack into operative contact and away from said suction head, spaced suction heads on said drum movable into transverse alignment with said first suction head for gripping engagement of said label, means for engaging said first suction head to rotate the same with said drum in alignment with said second mentioned suction heads for a certain distance, and means for causing said first suction head to release said label and return to said initial position independent of the rotation of said drum.

4. A labeling device having in combination, an oscillatable rack for holding labels, a rotating drum comprising transversely spaced portions, an arm mounted radially of said drum between said portions having a suction head at the outer end thereof within periphery of said drum at an initial starting position for gripping and holding a label and being movable independently of said drum, means for moving said rack into operative contact with said suction head and away therefrom for the transfer of a label from said rack to said suction head, a pair of spaced suction heads carried on said drum and movable into alignment with said first suction head to grip said label, means for engaging said arm to rotate said first suction head for a certain distance with said drum in alignment with said pair of spaced suction heads and to release its gripping action of said label and return to said starting position.

5. A labeling device having in combination, a rack for holding labels, a drum for carrying said labels, said drum comprising transversely spaced ribs thereabout, a second drum, said second drum having raised strips spaced transversely thereon and extending partially thereabout for carrying an adhesive, said second drum having an operative association with said first drum for the application of said adhesive to labels carried by said first drum, and said strips being positioned to be in alignment with the spaces between the ribs of said first drum whereby in the absence of a label on said first drum there will be no application of adhesive to said drum.

6. A device for applying a label onto a product having in combination, a rotating drum for carrying said label, a radially oscillating member having a single suction head being operatively associated with said drum and normally being at a starting position, a rack for holding labels, means for moving said rack to bring the leading label thereon into contact with said suction head to be gripped and held in a stationary position by said suction head on the surface of said drum, a pair of suction heads in said drum spaced transversely thereof and movable into alignment with said single suction head by rotation of said drum, means operatively associated with said drum for holding said single and said pair of suction heads in alignment for a portion of the travel of a rotation of said drum, means for activating said pair of suction heads when brought into alignment with said single suction head to grip said label whereby all of said suction heads grip and hold said label, said first mentioned means inactivating said single suction head when all of said suction heads have rotated in alignment for a portion of the travel of a rotation of said drum and means for returning said oscillating member to said starting position, said drum being mounted on a shaft and comprising a pair of axially spaced portions forming an annular groove centrally thereof, said radially oscillating member being journaled at one end onto said shaft and disposed in said groove, said single suction head at the free end of said oscillating member being substantially flush with the surface of said drum, a detent in said drum for engaging said oscillating member and being normally in a position disengaged therefrom, a cam plate engaged by one end of said detent for moving said detent into engagement with said oscillating member for a portion of the travel of the rotation of said drum, said detent engaging said oscillating member when said pair of spaced suction heads are in alignment with said single suction head, and means for returning said oscillating member to said starting position when said detent is disengaged therefrom.

7. The structure set forth in claim 6, a cam moving in rotation with said drum and in coordination with the movement of said oscillating member for controlling said means activating said single suction head to create suction therein.

8. The structure set forth in claim 6, a cam carried on said drum shaft for controlling said means for activating said pair of suction heads to create suction therein.

References Cited in the file of this patent

UNITED STATES PATENTS

| | | |
|---|---|---|
| 2,214,096 | Weiss | Sept. 10, 1940 |
| 2,282,162 | Bronander | May 5, 1942 |
| 2,391,694 | Everett | Dec. 25, 1945 |
| 2,545,292 | Magnusson | Mar. 13, 1951 |
| 2,773,617 | Weiss | Dec. 11, 1956 |
| 2,788,150 | Rose | Apr. 9, 1957 |